US006839252B2

(12) United States Patent
Tai et al.

(10) Patent No.: US 6,839,252 B2
(45) Date of Patent: Jan. 4, 2005

(54) TWO-STEP RIPPLE-FREE MULTI-PHASE BUCK CONVERTER AND METHOD THEREOF

(75) Inventors: Liang-Pin Tai, Tainan (TW); Shwu-Liang Hsieh, Taichung (TW); Hung-I Wang, Changhua (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 63 days.

(21) Appl. No.: 10/442,077

(22) Filed: May 21, 2003

(65) Prior Publication Data

US 2003/0218893 A1 Nov. 27, 2003

(30) Foreign Application Priority Data

May 27, 2002 (TW) ........................................ 91111366 A (51) Int. Cl.[7] .............................. H02M 7/00; G05F 1/40
(52) U.S. Cl. .............................. 363/65; 363/71; 323/272
(58) Field of Search ............................... 363/71, 65, 72, 363/16, 97; 323/213, 246, 283, 284, 271, 272

(56) References Cited

U.S. PATENT DOCUMENTS

| 5,045,989 | A | * | 9/1991 | Higaki et al. ................. 363/37 |
| 5,191,519 | A | * | 3/1993 | Kawakami ..................... 363/71 |
| 5,473,528 | A | * | 12/1995 | Hirata et al. .................. 363/71 |
| 5,834,925 | A | * | 11/1998 | Chesavage ................... 323/272 |
| 6,137,274 | A | * | 10/2000 | Rajagopalan ................. 323/272 |
| 6,366,062 | B2 | * | 4/2002 | Baretich et al. .............. 323/223 |

* cited by examiner

*Primary Examiner*—Rajnikant B. Patel
(74) *Attorney, Agent, or Firm*—Rosenberg, Klein & Lee (57) ABSTRACT

A two-step ripple-free multi-phase buck converter and method thereof comprises a first-stage voltage regulator to convert an input voltage to an intermediate voltage and a second-stage voltage regulator with a phase number not less than two to further convert the intermediate voltage to an output voltage by a split phase control, in which the ratio of the intermediate voltage to the output voltage is intended to the phase number such that the steady state output current of the converter approaches to be ripple-free, and hence the drivers and MOSFETs for the second-stage voltage regulator are lower cost, the efficiency of the second-stage voltage regulator is improved, and a higher slew rate current is obtained for transient driving capabilities.

12 Claims, 8 Drawing Sheets

TWO-STEP RIPPLE-FREE MULTI-PHASE BUCK CONVERTER AND METHOD THEREOF

FIELD OF THE INVENTION

The present invention relates generally to a multi-phase buck converter, and more particularly to a two-step ripple-free multi-phase buck converter and the method thereof.

BACKGROUND OF THE INVENTION

Figure 1:
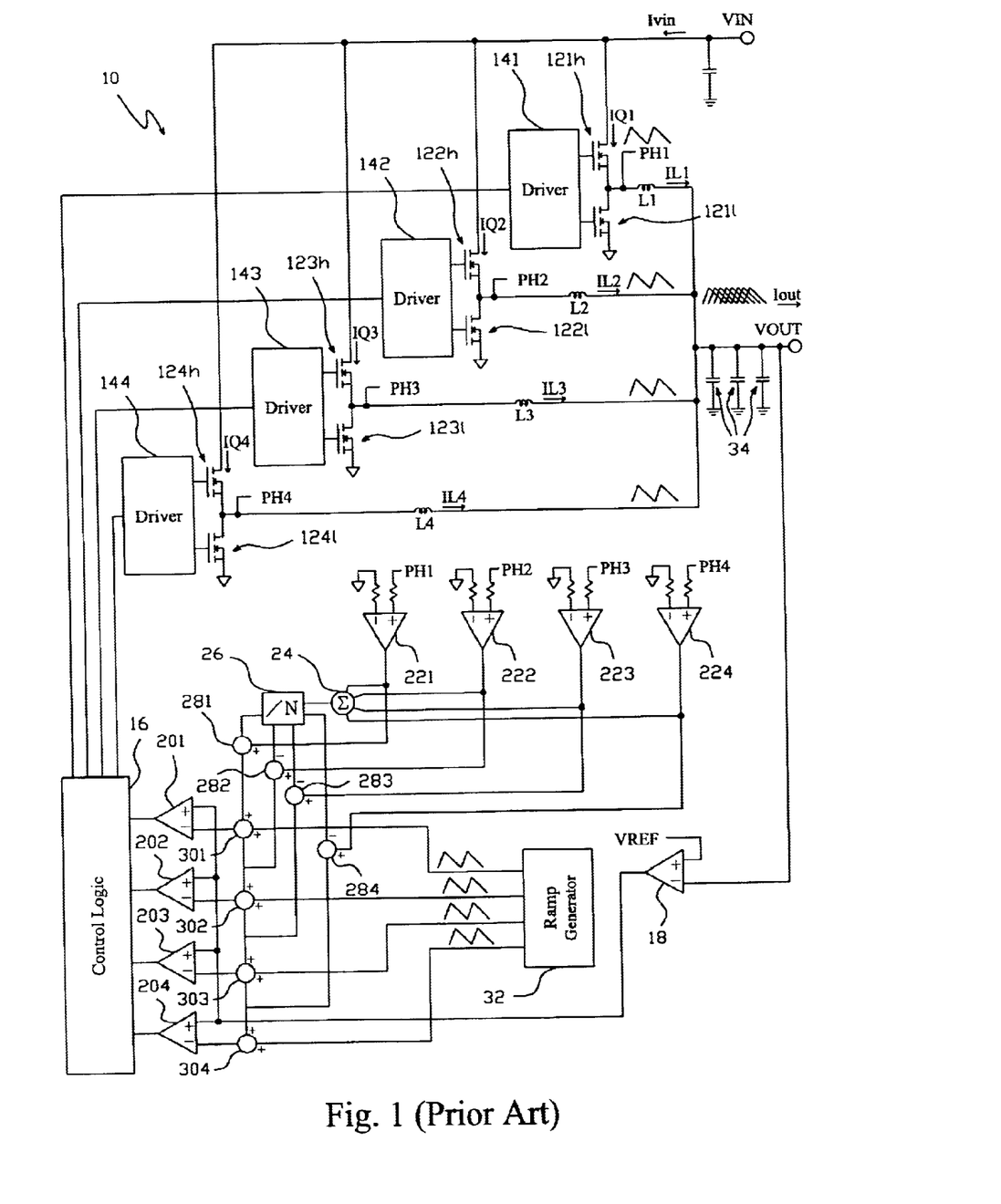
FIG. 1 is the diagram of a conventional four-phase buck converter.

Multi-phase buck converters have been widely used for various applications, such as power supply circuits. For example, as shown in FIG. 1, a four-phase buck converter 10 has four output stages each corresponding to one phase thereof and including a pair of MOSFETs connected in series, i.e., MOSFETs 121*h* and 121*l*, 122*h* and 122*l*, 123*h* and 123*l*, and 124*h* and 124*l*, manipulated by respective drivers 141, 142, 143 and 144 in respective phases, which are controlled by a control logic 16. To obtain stable and balanced output in each phase, an error amplifier 18 is employed to compare a reference voltage VREF with the output voltage VOUT of the converter 10 to thereby produce a voltage error signal supplied to four pulse width modulation (PWM) comparators 201, 202, 203 and 204, each of which has its another input connected with the current error signal in respective phase. For generation of these current error signals, four current sense signal generators 221, 222, 223 and 224 are connected with the voltage PH1, PH2, PH3, and PH4, respectively, and ground in respective phase to produce four current sense signals for each phase to be further summed by a summing circuit 24 and averaged by a averaging circuit 26 to obtain an average current signal, and four subtracting circuits 281, 282, 283 and 284 subtract the average current signal from the current sense signals, respectively. These current error signals from the subtracting circuits 281, 282, 283 and 284 are further added with a ramp signal from a ramp generator 32 by four summing circuits 301, 302, 303 and 304, respectively, and the resulted signals are sent to the four PWM comparators 201–204 to be compared with the voltage error signal from the error amplifier 18 to thereby produce four feedback signals for the control logic 16 so as to control the drivers 141–144 to switch the MOSFETs 121–124 of the output stages to produce the converter output voltage VOUT and converter output current Iout on and from the output of the converter 10 through four output inductances L1, L2, L3 and L4 in each phase and output capacitance 34.

Figure 2A:
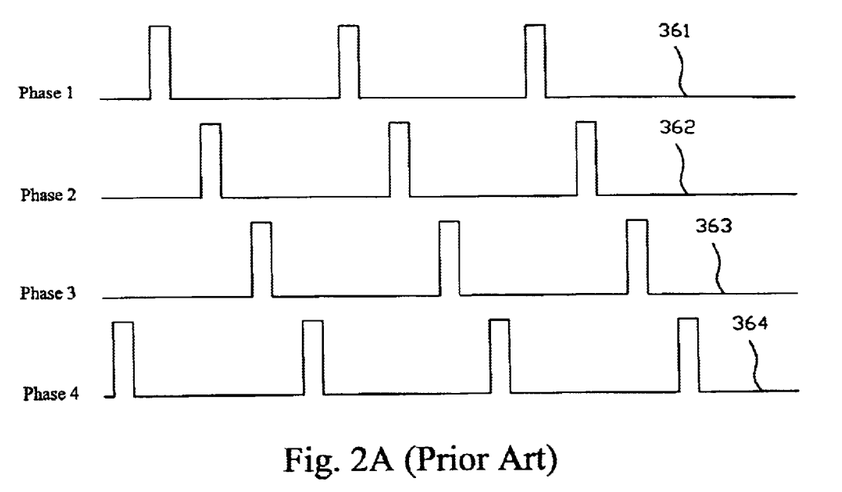
FIG. 2A shows the waveforms of the respective phase voltages PH1–PH4 of the converter 10 shown in FIG. 1.
Figure 2B:
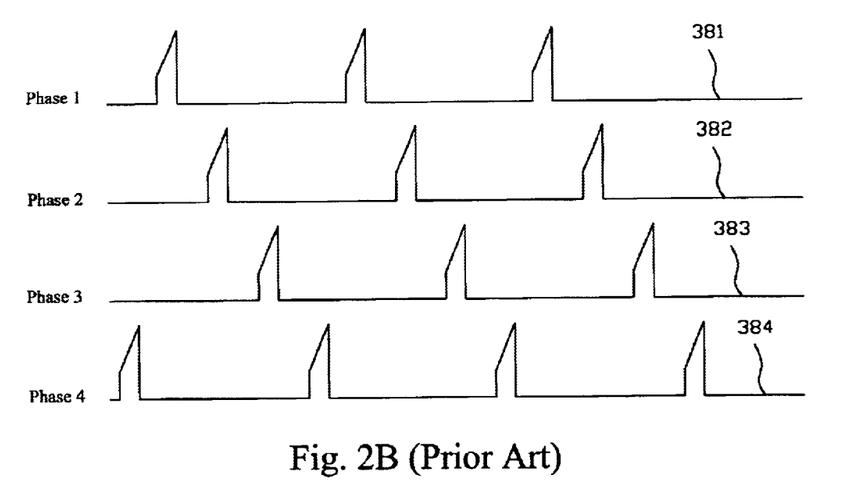
FIG. 2B shows the waveforms of the respective phase currents IQ1–IQ4 of the converter 10 shown in FIG. 1.
Figure 2C:
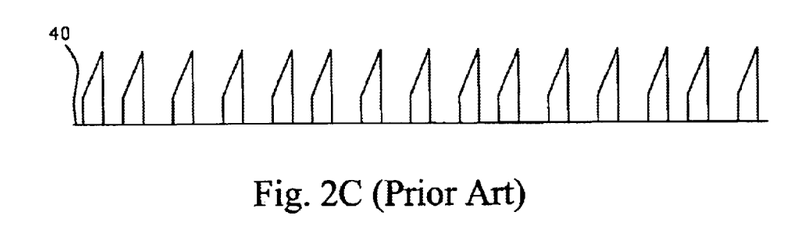
FIG. 2C shows the waveform of the input current IVIN from the supply voltage VIN of the converter 10 shown in FIG. 1.
Figure 3A:
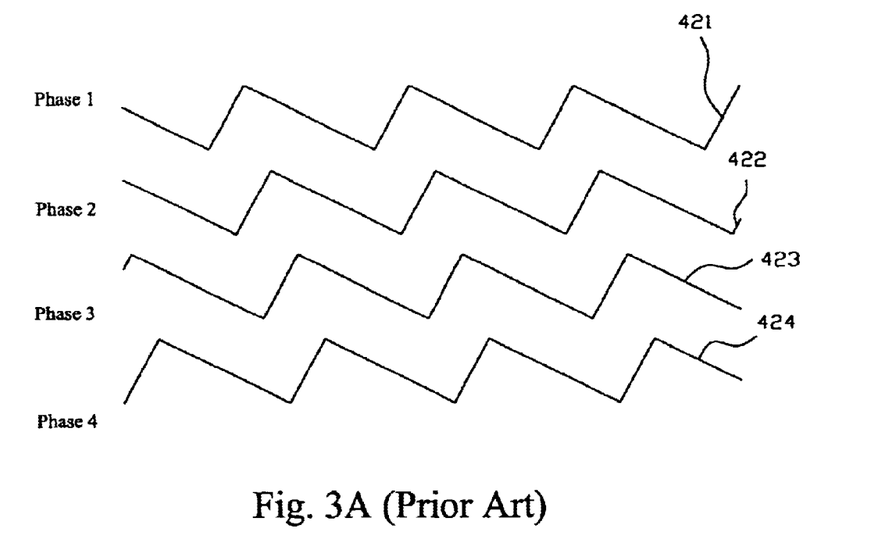
FIG. 3A shows the waveforms of the respective line currents IL1–IL4 of the converter 10 shown in FIG. 1.
Figure 3B:
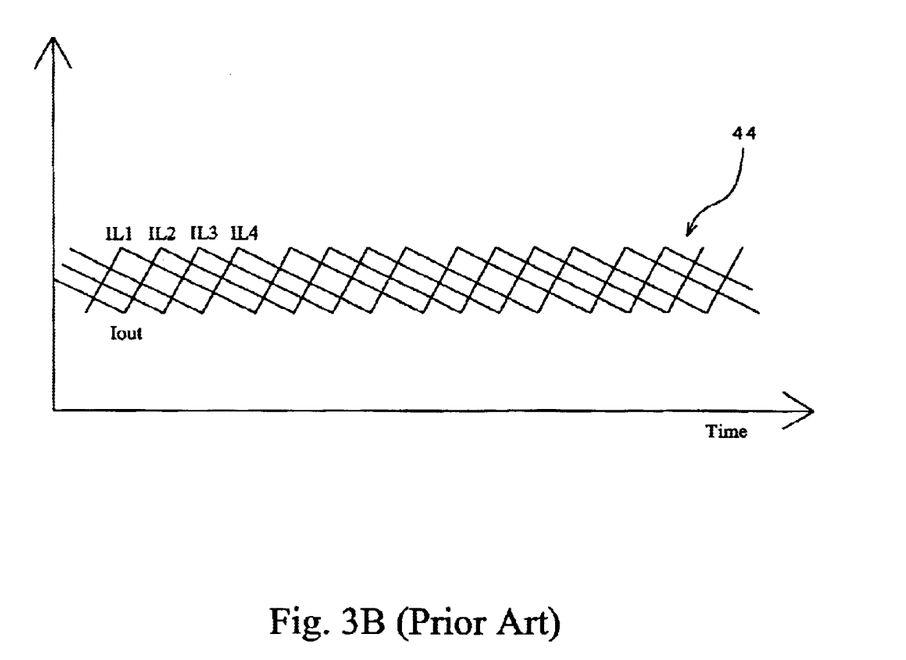
FIG. 3B is the combination of the line currents IL1–IL4 shown in FIG. 3A.

The converter 10 converts the energy supplied from the power supply with the input voltage VIN to the output VOUT by uniformly sharing the current to each phase and therefore generates four phase currents IQ1, IQ2, IQ3 and IQ4 and four phase voltages PH1–PH4 in each phase, respectively. FIG. 2 shows the waveforms of the phase voltages PH1–PH4 and phase currents IQ1–IQ4 in each phase and input current Ivin from the input node VIN. In FIG. 2A, waveform 361 is the phase voltage PH1 of phase 1, waveform 362 is the phase voltage PH2 of phase 2, waveform 363 is the phase voltage PH3 of phase 3, and waveform 364 is the phase voltage PH4 of phase 4. In FIG. 2B, waveforms 381, 382, 383 and 384 are the phase currents IQ1–IQ4 in each phase, respectively, and their sum is represented by waveform 40 for the input current Ivin shown in FIG. 2C. Among them the duty in each phase depends on the ratio of the output voltage to input voltage, i.e., VOUT/VIN. The output stages in each phase produce respective line currents IL1, IL2, IL3 and IL4 through the output inductances L1–L4 and their sum Iout, i.e., the converter output current, as shown in FIG. 3. In FIG. 3A, waveform 421 is the line current IL1 of phase 1, waveform 422 is the line current IL2 of phase 2, waveform 423 is the line current IL3 of phase 3, and waveform 424 is the line current IL4 of phase 4. Waveform 44 shown in FIG. 3B represents the converter output current Iout. Although this scheme obtains stable converter output voltage VOUT and balanced phase currents IQ1–IQ4 between phases, the converter output current Iout has severe ripples and the behavior of the ripples relate to the duty in each phase. Unfortunately, the rippled output is disadvantageous to the load of the converter. Therefore, it is desired a ripple-free multi-phase buck converter. Further, the more is the difference between the input voltage VIN and the converter output voltage VOUT, the poorer efficiency has the converter. Also, higher voltage and faster switching speed are necessary for the MOSFETs of the output stages when the difference between the input voltage VIN and the converter output voltage VOUT becomes more. Accordingly, it is further desired a multi-phase buck converter with improved conversion efficiency and lower voltage and lower cost output stages and drivers.

SUMMARY OF THE INVENTION

One object of the present invention is to provide a multi-phase buck converter intended to have ripple-free output current.

Another object of the present invention is to provide a multi-phase buck converter capable of utilizing lower voltage and lower cost drivers and MOSFETs in the converter.

Yet further object of the present invention is to provide a multi-phase buck converter with improved conversion efficiency.

Still further object of the present invention is to provide a multi-phase buck converter having higher slew rate current for transient driving capabilities.

To convert an input voltage to an output voltage, according to the present invention, a two-step ripple-free multi-phase buck converter comprises a first-stage voltage regulator to convert the input voltage to an ideal intermediate voltage in advance and a second-stage voltage regulator with a phase number not less than two to further convert the intermediate voltage to the output voltage by a split phase control. The ratio of the intermediate voltage to the output voltage is locked to be the phase number such that the steady state output current of the converter is ripple-free.

In a four-phase embodiment, the first-stage voltage regulator includes an output stage composed of MOSFETs, a driver to switch the MOSFETs by a PWM signal, and a pulse width modulator to produce the PWM signal. In addition, a phase detector is connected with the control signals of the drivers in the second-stage voltage regulator and the intermediate voltage to sense the phase error between each phase thereof, and the detected signal thus obtained is sent through a filter to a phase number lock loop to determine the duty of the pulse width modulator in the first-stage voltage regulator. In the first-stage voltage regulator, the pulse width modulator compares the output of the phase number lock loop with a ramp signal to produce the PWM signal to control the driver to manipulate the MOSFET in the output stage, and, as a result, to regulate the intermediate voltage for the ratio of the intermediate voltage to the output voltage to approach to the phase number.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 4:
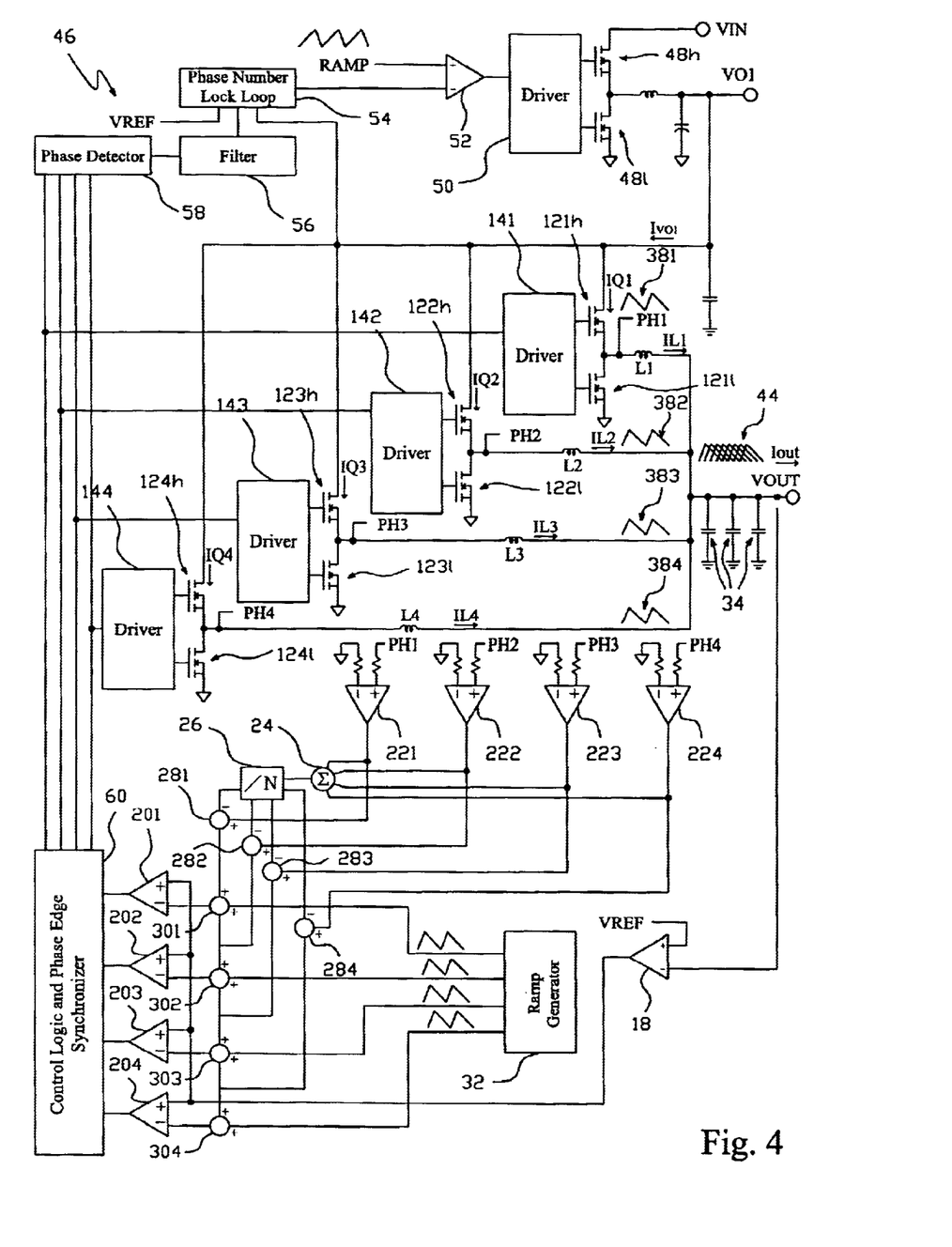
FIG. 4 shows a four-phase embodiment according to the present invention.

FIG. 4 is a four-phase converter 46 according to the present invention, which comprises a first-stage voltage regulator and a second-stage voltage regulator. The first-stage voltage regulator includes an output stage composed of MOSFETs 48h and 48l connected in series, a driver 50 to switch the MOSFETs 48h and 48l, a pulse width modulator 52 to produce the PWM signal to switch the driver 50. Moreover, a phase number lock loop 54, a filter 56, a phase detector 58, and a phase edge synchronizer 60 are provided. The second-stage voltage regulator is similar to the conventional circuit shown in FIG. 1, except that the control logic and phase edge synchronizer 60 are integrated in a block, and the same reference numbers are used to refer to the same blocks as in FIG. 1. The MOSFET 48h of the first-stage voltage regulator is connected with the supply voltage VIN and through which the input voltage VIN is converted to an ideal intermediate voltage VO1. The intermediate voltage VO1 is then served as the input voltage of the second-stage voltage regulator. The input current Ivo1 from the node VO1 of the first-stage voltage regulator to the second-stage voltage regulator is split into four phases uniformly, and the converter output voltage VOUT and converter output current Iout are produced on and from the converter output node VOUT.

The first-stage voltage regulator converts the input voltage VIN to a specific intermediate voltage VO1, which is locked to have the ratio VO1/VOUT equal to the phase number PN of the second-stage voltage regulator. The phase number PN in this embodiment is 4, and therefore, $$VO1/VOUT = PN = 4$$

or $$VO1 = PN \times VOUT = 4 \times VOUT.$$

For instance, in the case of the input voltage VIN is 12V and the output voltage VOUT is 1V, the first-stage voltage regulator will convert 12V to $$VO1 = 4 \times 1 = 4V,$$

which voltage is then supplied to the second-stage voltage regulator for further conversion by split phase control. The phase detector 58 is connected with the control signals of the drivers 141–144 in the second-stage voltage regulator and the intermediate voltage VO1 to sense the phase error between each phase of the second-stage voltage regulator, and the detected signal thus produced is sent through the filter 56 to the phase number lock loop 54 to determine the duty of the pulse width modulator 52 in the first-stage voltage regulator. The filter 56 is optional, instead necessary, to ensure a correct control signal. The pulse width modulator 52 compares the output of the phase number lock loop 54 with a ramp signal RAMP to produce the PWM signal to control the driver 50 to switch the MOSFETs 48h and 48l for the intermediate voltage VO1 approach to $$VO1/VOUT = 4.$$

In a buck converter, if the loss resulted from the device resistance connected in series is not taken in consideration, the duty of the converter is the ratio of the converter output voltage VOUT to the supplied input voltage VIN, i.e., the duty $$D = VOUT/VIN.$$

If the phase number of a multi-phase buck converter equals to the ratio VIN/VOUT, the phase number $$PN = VIN / VOUT$$
$$= 1 / (VOUT / VIN)$$
$$= 100\% / D.$$

This manner the ON time will be the same for each phase and the edge will be aligned in each phase. As in the foregoing description, in the invented multi-phase buck converter the phase number of the second-stage voltage regulator is VO1/VOUT, where VO1 is the input voltage of the second-stage voltage regulator. Hence, the ON time in each phase of the converter 46 will be equal and the edge of each phase will be aligned.

Figure 5A:
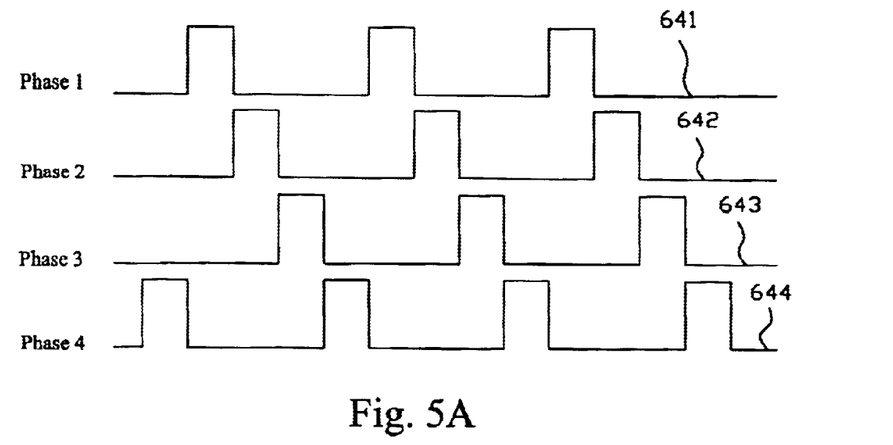
FIG. 5A shows the waveforms of the respective phase voltages PH1–PH4 of the second-stage voltage regulator of FIG. 4.
Figure 5B:
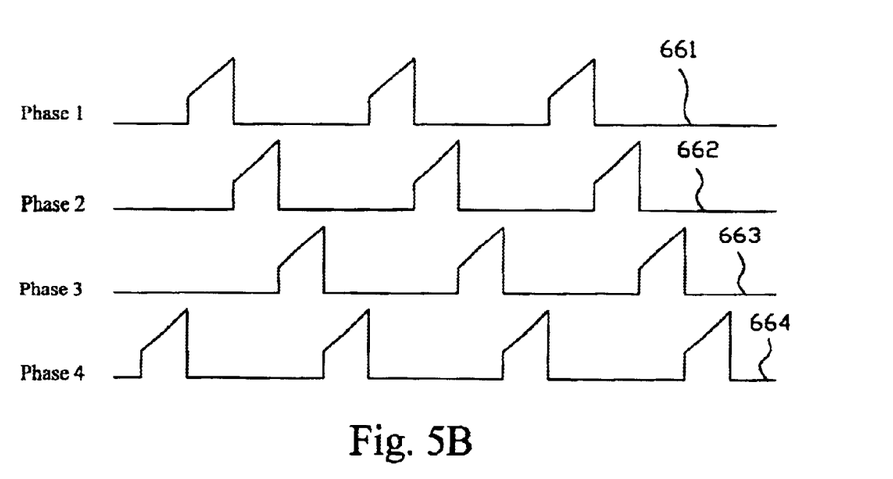
FIG. 5B shows the waveforms of the respective phase currents IQ1–IQ4 of the second-stage voltage regulator of FIG. 4.
Figure 5C:
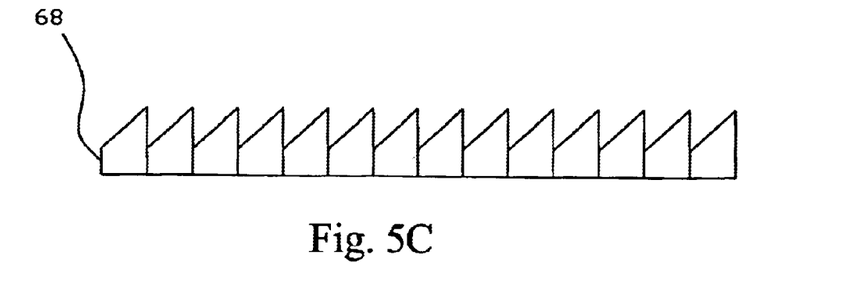
FIG. 5C shows the waveform of the input current IVO1 of the second-stage voltage regulator of FIG. 4 from the node VO1.
Figure 6A:
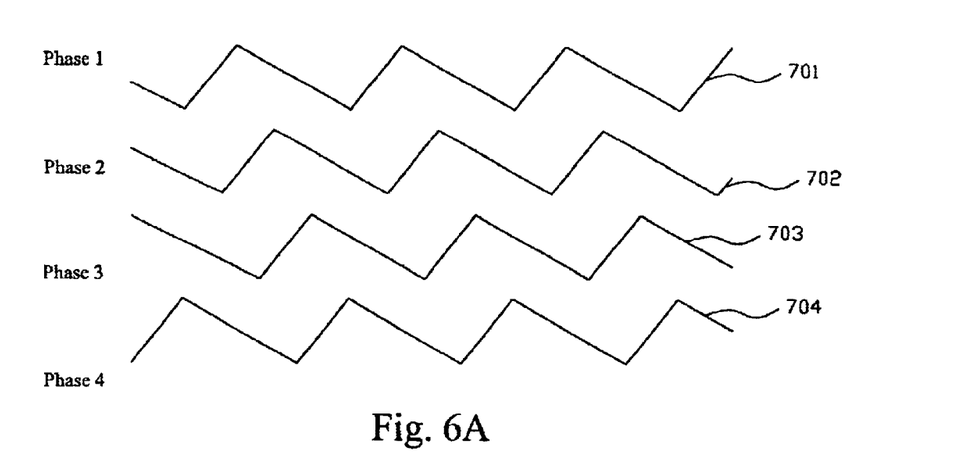
FIG. 6A shows the waveforms of the respective line currents IL1–IL4 of the second-stage voltage regulator of FIG. 4.
Figure 6B:
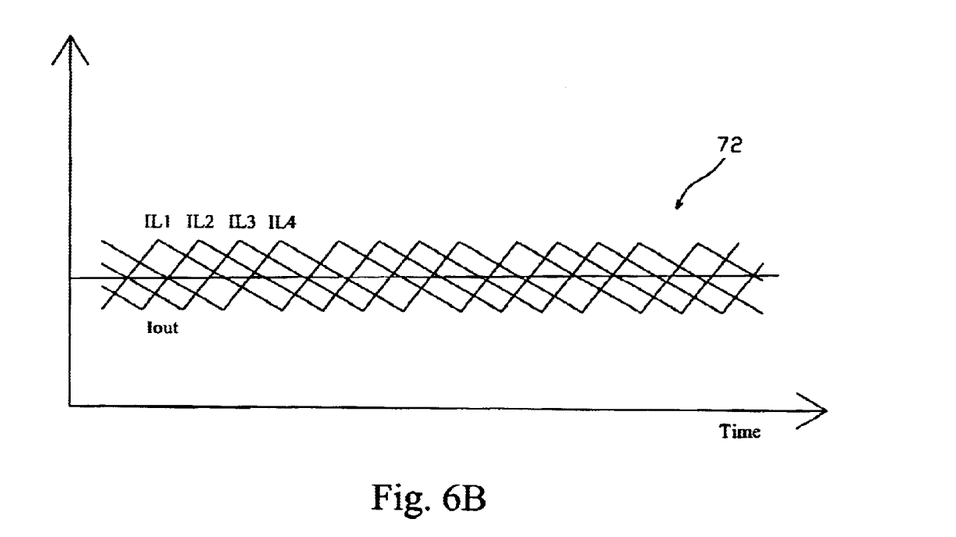
FIG. 6B is the combination of the line currents IL1–IL4 shown in FIG. 6A.

The operational principle of the second-stage voltage regulator is similar to that of the conventional circuit, i.e., it converts the intermediate voltage VO1 to the converter output voltage VOUT by a split phase control. However, the split phase control will separate each phase operated in a fixed timing region. Moreover, the control logic and phase edge synchronizer 60 control the driver 50 to make it synchronous to the first phase of the second-stage voltage regulator. When the first-stage voltage regulator converts the input voltage VIN to the ideal intermediate voltage VO1, i.e., the ratio of the intermediate voltage to the output voltage (VO1/VOUT) equal to the phase number of the second-stage voltage regulator (it's 4 in this embodiment), for instance, in the above example, the output voltage VOUT is 1V and the intermediate voltage VO1 is 4V, it is therefore $$VO1/VOUT=4,$$

which is the same as the phase number of the second-stage voltage regulator. As such, the split phases become completely edge aligned, and their waveforms are shown in FIG. 5. In FIG. 5A, the output voltages PH1–PH4 in each phase are waveforms 641, 642, 643 and 644. In FIG. 5B, the output currents IQ1–IQ4 in each phase are waveforms 661, 662, 663 and 664. The sum of the output currents IQ1–IQ4 in these phases is the waveform 68 in FIG. 5C, as the input current Ivo1 flowing into the second-stage voltage regulator from the node VO1, and in which the edge in each phase is just aligned to the edges of adjacent phases. In a balanced situation, the duty in each phase is ¼, as the reciprocal of the phase number. The line currents IL1–IL4 in each phase produced by the output stages through the inductances L1–L4 and the summed converter output current Iout are shown in FIG. 6. In FIG. 6A, the line currents IL1–IL4 in each phase are waveforms 421, 422, 423 and 424, and the waveform 72 in FIG. 6B is the converter output current Iout. Because the ripples in each phase counterbalance to each other, the converter output current Iout obtained by this method would be ripple-free. With the two-step operation, the input voltage VO1 of the second-stage voltage regulator is lowered, and the transient spike current stress is also lowered when the input current is split into the phases.

Figure 7A:
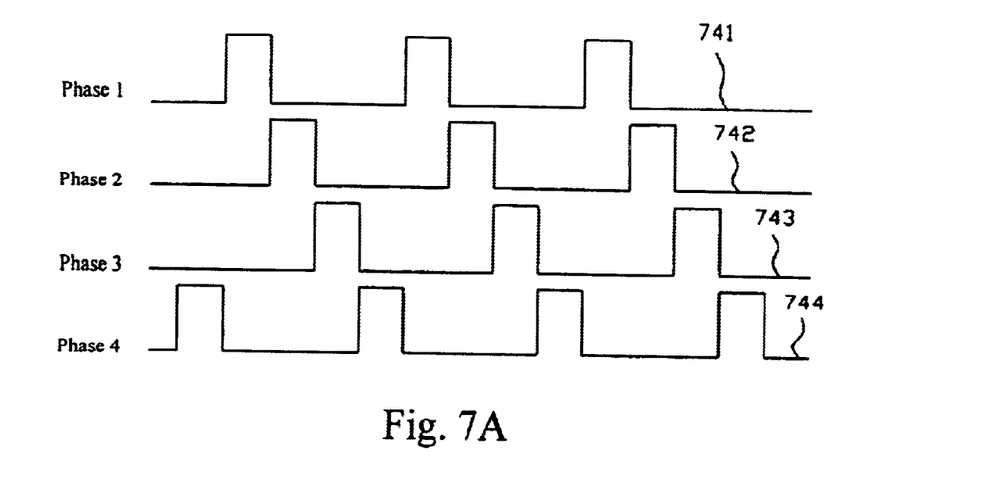
FIG. 7A shows the waveforms of the ideal phase voltages PH1–PH4.
Figure 7B:
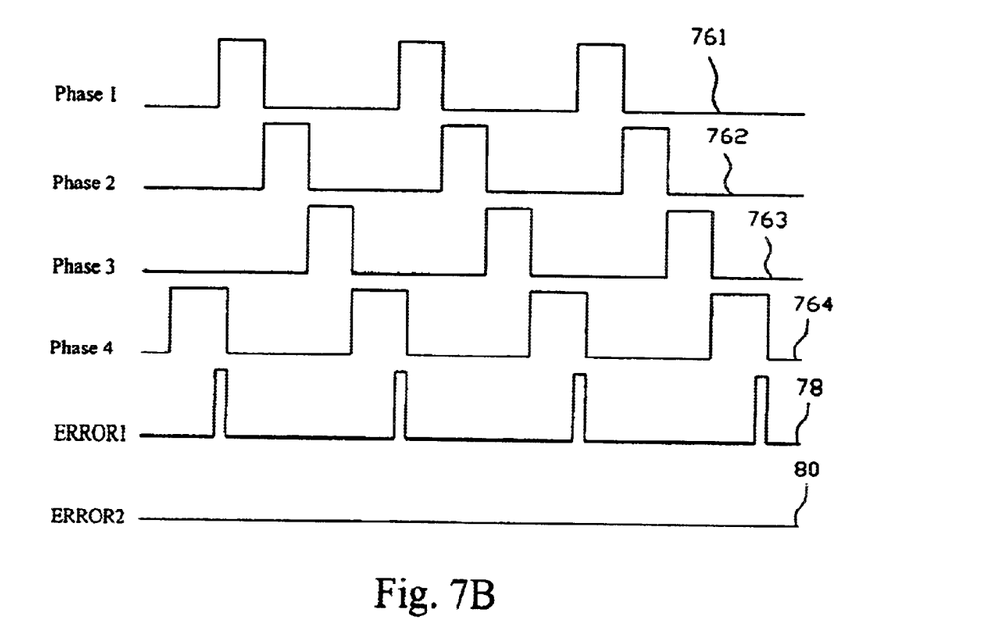
FIG. 7B shows the waveforms of the respective phase voltages PH1–PH4 and phase error signals when the intermediate voltage VO1 is lower than the target value.
Figure 7C:
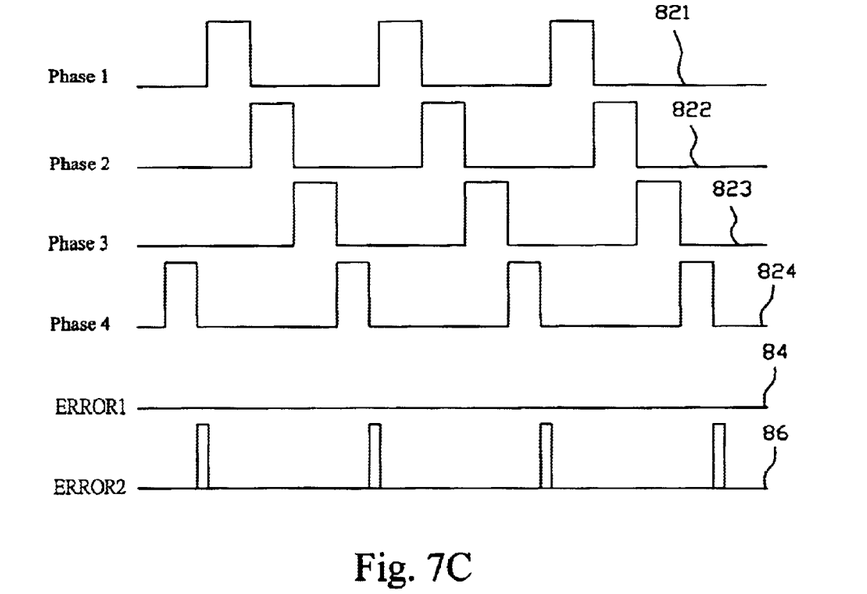
FIG. 7C shows the waveforms of the respective phase voltages PH1–PH4 and phase error signals when the intermediate voltage VO1 is higher than the target value.

FIG. 7 is an embodiment of the control to the duty. FIG. 7A shows the waveforms 741, 742, 743 and 744 of the output voltages PH1–PH4 in each phase under the ideal situation. The duty in each phase is ¼, and this value is the reciprocal of the phase number of the second-stage voltage regulator. As mentioned above, when the intermediate voltage is 4V, the converter output voltage VOUT is 1V, and the edges of the phases are aligned to each other by the phase edge synchronizer 60 utilizing for example edge trigger technique. The situation shown in FIG. 7A is the target value of the converter 46. When imbalance, for example the intermediate voltage VO1 lower than the target value, as shown in FIG. 7B with the waveforms 761, 762, 763 and 764 for the output voltages PH1–PH4 in each phase, the phase detector 58 detects the phase error between each phase and produces the phase error signal ERROR1 and ERROR2 as shown by the waveforms 78 and 80. Because the converter 46 keeps the output voltage VOUT at the desired one, the ON time of the fourth phase will be larger than that of the period time divided by the phase number (i.e., ¼ cycle in this embodiment), and the phase detector 58 detects the phase error between each phase and obtains the phase error signal ERROR1. The value of this error can be obtained by counter, and the phase number lock loop 54 will adjust the duty by referring to this error so as to lengthen the ON time of the first phase, and the new duty is also used by the other phases. Contrarily, when the intermediate voltage VO1 is higher than the target value, as shown in FIG. 7C by the waveforms 821, 822, 823 and 824 for the output voltages PH1–PH4 in each phase, the phase detector 58 detects the phase error between each phase and produces the phase error signal ERROR1 and ERROR2, as shown by waveforms 84 and 86. Because the converter 46 keeps the output voltage VOUT at the desired one, the ON time of the fourth phase will be smaller than that of the period time divided by the phase number (i.e., ¼ cycle in this embodiment), and the phase detector 58 detects the phase error between each phase and obtains the phase error signal ERROR2. The phase number lock loop 54 will adjust the duty by referring to this error so as to shorten the ON time of the first phase, and the new duty is also used by the other phases.

There are more advantages resulted. With the two-step operation, the second-stage voltage regulator is operated in a lower voltage condition, therefore, lower voltage and cost drivers and MOSFETs could be used as the output stages, and more cost is saved for more phases. The efficiency is also improved since the second-stage voltage regulator is operated in a lower voltage condition. Further, due to the ripple-free output current, smaller output inductances could be used and thus higher slew rate current is obtained for transient driving capabilities. Especially, when the load is positioned close to the output capacitance 34 and output inductances L1–L4, or the parasitical inductance is very small, the slew rate current for transient driving capabilities required by the load can be directly provided by the output capability of the output inductances L1–L4, and thus the output capacitance 34 can be also reduced. Because the multi-phase buck converter has large output ripple and poor efficiency at high converted voltage ratio, the improvement by the invented two-step multi-phase converter will be more outstanding when the ratio of the supply voltage to the converter output voltage is larger.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A two-step ripple-free multi-phase converter for converting an input voltage to an output voltage, the converter comprising:
    a first-stage voltage regulator for converting the input voltage to an intermediate voltage; and
    a second-stage voltage regulator with a phase number not less than two for converting the intermediate voltage to the output voltage by a split phase control;
    wherein the intermediate voltage is intended to a target value for a ratio of the intermediate voltage to the output voltage equal to the phase number.

2. The converter of claim 1, wherein the first-stage voltage regulator comprises:
    an output stage including a MOSFET connected with the input voltage for generating the intermediate voltage;
    a driver connected with a PWM signal for switching the MOSFET; and
    a pulse width modulator for producing the PWM signal.

3. The converter of claim 2, further comprising:
    a phase number lock loop for determining a duty of the PWM signal;
    a phase detector connected to the second-stage voltage regulator for sensing a phase error between each phase of the second-stage voltage regulator to thereby produce a detected signal to the phase number lock loop; and
    a phase edge synchronizer connected to the second-stage voltage regulator for edge alignment of phases of the second-stage voltage regulator.

4. The converter of claim 3, further comprising a filter for filtering the detected signal.

5. A two-step ripple-free multi-phase conversion method for converting an input voltage to an output voltage, the method comprising the steps of:
   converting the input voltage to an intermediate voltage; and
   converting the intermediate voltage to the output voltage by a split phase control with a phase number not less than two;
   wherein the intermediate voltage is intended to a target value for a ratio of the intermediate voltage to the output voltage equal to the phase number.

6. The method of claim 5, wherein the converting of the input voltage to the intermediate voltage comprises a pulse width modulation.

7. The method of claim 6, further comprising locking a duty of the pulse width modulation for the ratio of the intermediate voltage to the output voltage to approach to the phase number.

8. The method of claim 7, further comprising sensing a phase error between each phase in the split phase control to thereby determine the duty.

9. The method of claim 6, further comprising synchronizing the pulse width modulation to the split phase control.

10. The method of claim 5, further comprising edge alignment of phases in the split phase control.

11. The method of claim 7, further comprising adjusting the duty higher once the intermediate voltage lower than the target value.

12. The method of claim 7, further comprising adjusting the duty lower once the intermediate voltage higher than the target value.

* * * * *